(12) United States Patent
Meier et al.

(10) Patent No.: US 7,588,230 B2
(45) Date of Patent: Sep. 15, 2009

(54) PLUG-IN SAFETY COUPLING FOR PRESSURE PIPES, COMPRISING A PIVOTED BLOCKING MEMBER

(75) Inventors: Ulrich Meier, Waedenswil (CH); Hans Greminger, Horgen (CH)

(73) Assignee: Hans Oetiker AG Maschinen-und Apparatefabrik, Horgen (CH)

( * ) Notice: Subject to any disclaimer, the term of this patent is extended or adjusted under 35 U.S.C. 154(b) by 156 days.

(21) Appl. No.: 10/597,037

(22) PCT Filed: Dec. 28, 2004

(86) PCT No.: PCT/IB2004/004328

§ 371 (c)(1),
(2), (4) Date: Apr. 4, 2007

(87) PCT Pub. No.: WO2005/075868

PCT Pub. Date: Aug. 18, 2005

(65) Prior Publication Data

US 2007/0272892 A1 Nov. 29, 2007

(30) Foreign Application Priority Data

Jan. 9, 2004 (CH) .................................. 0030/04

(51) Int. Cl.
*F16K 51/00* (2006.01)
(52) U.S. Cl. .................. 251/149.8; 285/277; 251/149.1
(58) Field of Classification Search ...... 251/149–149.9, 251/89.5, 142; 137/615, 616.7, 377, 382; 285/45, 273, 275–277, 316; 222/519
See application file for complete search history.

(56) References Cited

U.S. PATENT DOCUMENTS

| 2,493,271 | A | * | 1/1950 | Shane et al. | ................. 251/149 |
| 3,871,522 | A | * | 3/1975 | Feldman | ..................... 206/540 |
| 4,662,396 | A | * | 5/1987 | Avnon | ...................... 137/616.7 |
| 4,905,965 | A | * | 3/1990 | Dolev | ....................... 251/149.9 |
| 5,050,841 | A | * | 9/1991 | Jacobsson | ................. 251/149.9 |
| 5,326,072 | A | | 7/1994 | Wuethrich | |

(Continued)

FOREIGN PATENT DOCUMENTS

CH          685257 A5        5/1995

*Primary Examiner*—John K Fristoe, Jr.
*Assistant Examiner*—Marina Tietjen
(74) *Attorney, Agent, or Firm*—Barnes & Thornburg LLP

(57) ABSTRACT

A plug-in safety coupling for pressure pipes consists of a coupler box with a blocking member pivotally mounted therein. The latter has a diametrical through bore in which a plug can be inserted, in a depressurized state, at an acute to a right angle to the conducting position. The blocking member can be brought into the conducting position by pivoting the plug. A cupped locking sleeve shaving a hemispherical front end is placed over the coupler box with the pivoting member. This hemispherical front end comprises a spherically extending oblong hole that extends along a great circle on the hemispherical end from the center thereof. The locking sleeve is rotatably mounted on the coupler box and is biased by a spring to such an extent that its oblong hole extends with an offset by 90° relative to the pivoting plane of the blocking member of the plug. Only when the locking sleeve is pivoted, a plug can be inserted. Once the plug is pivoted into the conducting position, the locking sleeve, by the force of the spring, is pivoted by 90° and secures the plug from pivoting back.

13 Claims, 3 Drawing Sheets

U.S. PATENT DOCUMENTS

| | | |
|---|---|---|
| 5,562,273 A | 10/1996 | Wuethrich |
| 5,681,027 A | 10/1997 | Wuethrich |
| 6,422,267 B1 * | 7/2002 | Makishima et al. ...... 137/616.7 |
| 6,827,329 B2 * | 12/2004 | Mikiya et al. .................. 251/97 |
| 6,899,132 B2 * | 5/2005 | Mikiya et al. ............ 137/616.7 |
| D521,614 S * | 5/2006 | Kitagawa .................... D23/262 |
| 2004/0239111 A1 * | 12/2004 | Wuthrich .................... 285/283 |

* cited by examiner

PLUG-IN SAFETY COUPLING FOR PRESSURE PIPES, COMPRISING A PIVOTED BLOCKING MEMBER

BACKGROUND AND SUMMARY OF THE INVENTION

This invention relates to a plug-in safety coupling for pressure pipes, such as for gases or fluids, comprising a pivotal blocking member. Couplings having pivotal blocking members have long been known. The coupling consists of a coupler box and a coupling plug, the coupler box constituting a housing within which a cylindrical blocking member is pivotally mounted. The cylindrical blocking member is diametrically penetrated by a bore. When the blocking member is pivoted within the coupler box such that its diametrical bore is no longer aligned, and in communication, with the pressure pipe, the flow is interrupted and the coupling plug may be plugged into the blocking member in a depressurized state, whereupon it is pivoted to the flow position along with the blocking member.

It must be ascertained that the conducting position is secured, which means that the coupling plug must be prevented from pivoting back with the blocking member. A plurality of alternatives are known for such securing. According to one alternative, the coupler housing, which encloses the blocking member and has a slot or oblong hole along the pivoting path of the plug, is specially shaped to secure the plug in the conducting position. The two inner edges of the arcuate oblong hole have a recess at the end of the oblong hole, i.e. in the conducting position of the plug, which recess is engaged by the plug due to the existing pressure by means of a shoulder formed on the plug. Therefore, the plug cannot pivot back unless it is previously pressed a short length into the blocking member against the pressure prevailing in the pipe so that its shoulder leaves the recess to permit pivoting. A disadvantage of this alternative resides in the fact that the plug must be pressed into the blocking member against the pressure within the pressure pipe, which is problematic for plugs of larger diameter and at higher pressure.

Another way of securing the conducting position of the plug comprises a sleeve which encloses the coupler housing at the rear side thereof and is easily axially movable on the coupler housing to the rear in the direction of the pressure pipe against the force of a spring. The front rim of the sleeve has two diametrically disposed cams projecting from the rim, the cams engaging bores or recesses in the cylindrical wall of the blocking member. The bores or recesses are so disposed that they are engaged by the cams in the conducting position of the blocking member. Provided are further bores or recesses which are engaged by the cams when the blocking member is pivoted to the coupling position. For engaging the safety coupling, the plug is first inserted into the blocking member. Then, the sleeve having the cams is withdrawn from the bores or recesses in the blocking member, whereupon the plug including the blocking member can be pivoted into the conducting position in which the cams of the spring-loaded plug again engage in correspondingly disposed bores or recesses on the blocking member to secure its pivoted position. For decoupling, the sleeve is withdrawn so that the blocking member is again set free to pivot.

A third alternative for blocking the pivotal blocking member in its various rotary positions is realised by a rotatable ring disposed on the rear side of the coupler box. This ring has a steep internal thread so that it is axially moved on the coupler box when the latter rotates. The periphery of the cylindrical blocking member has flat portions produced by milling, on which the front rim of the rotatable ring comes to lie when the ring is rotated on the coupler box so that it moves in the direction toward the plug. The rotatable ring may be spring-loaded by an internal spring so that it is held rotated in this direction and may be rotated back only against the force of this spring. It is only by such spring-loaded back rotation that the front rim may be caused to withdraw from the flat portion and enable the blocking member to pivot.

All above-mentioned ways of securing the blocking member in the conducting position, however, cannot ascertain that the coupler box is protected against intruding dirt or dust when decoupled. When the plug is not inserted in the blocking member, the open bore in the blocking member forms an aperture in which dirt or even small particles may enter. If this happens, the bore can be cleaned only with difficulty. If necessary, it must be jetted or washed and then dried by pressurised air in order to secure full tightness when a plug is inserted and a pressurised medium is to be conducted in a tight manner.

The above-mentioned ways of securing the pivoting member are also relatively expensive in manufacture and mounting. Moreover, their handling is not fully self-evident.

It is therefore the object of the present invention to provide a plug-in safety coupling for pressure pipes having a coupler box and a blocking member pivotally mounted therein, which coupling permits a structurally simple, elegant and easy to handle securing of the blocking member in its pivot position, in addition to preventing the ingression of dirt and dust when the plug is withdrawn.

This object is met by a plug-in safety coupling for pressure pipes comprising a coupler box pivotally mounted therein, the blocking member having a diametrical through bore in which a plug can be inserted in a depressurized state at an acute to right angle with respect to the conducting position and brought into the conducting position by pivoting the plug. A cap-like locking sleeve having a hemispherical front end is placed over the coupler box with the pivoting member. The hemispherical front end has a spherically extending oblong hole which extends from the center of the hemispherical end along a great circle on the hemispherical end. The cap-like locking sleeve is rotatably mounted on the coupler box and actuated by a spring so that its oblong hole extends at an angle with respect to the pivoting plane of the blocking member and the plug, and is rotatable against the force of the spring into the pivoting plane of the blocking member and the plug.

Additional features, which alone or in combination with any other feature(s), such as those listed above may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

This plug-in safety coupling for pressure pipes with its cap-shaped locking sleeve is shown in the drawings and will be described below and explained as to its function by referring to these drawings, in which.

DETAILED DESCRIPTION OF THE DRAWINGS

Figure 1:
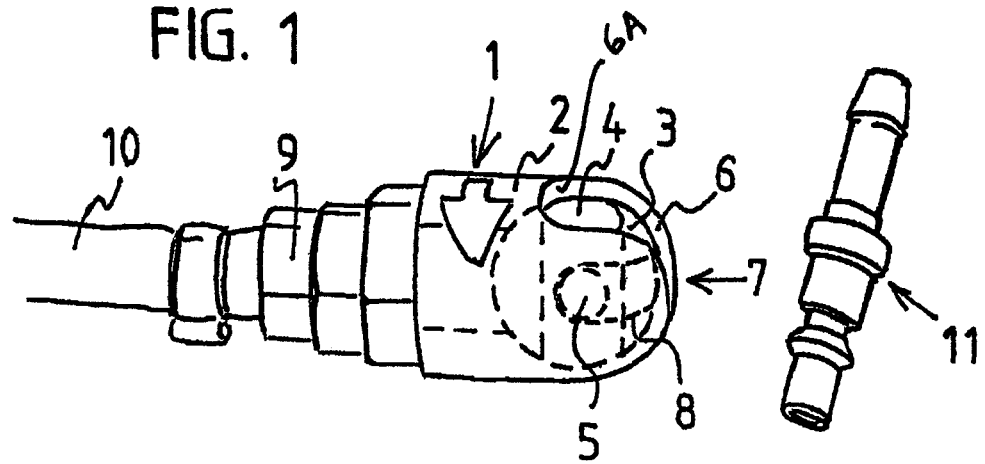
FIG. 1 shows the safety coupling in the decoupled state with the bore of the blocking member protected.

FIG. 1 shows the coupler box 1 with the locking sleeve 2 placed over it. The coupler box 1 consists of a housing 3 of an essentially spherical outer shape shown in phantom lines. A cylindrical blocking member 4 is pivotally and sealingly mounted within the housing. The coupler box 1 is sealingly threaded or clamped to a pressure pipe 10 by means of a nut 9 or clamp. The cylindrical blocking member 4, which is also shown in phantom lines because it is not seen here, is diametrically penetrated by a bore 5 into which an appertaining plug 11 may be inserted in a sealing manner. The cap-like locking sleeve 2, which has such an inner diameter that it may be placed over the housing 3 from the front, has a hemispherical front portion and an oblong hole 6 which extends spherically about an angle of 90° round one side of the hemispherical front end of the locking sleeve 2 from the center of the blocking member 4 to the front tip 7 of the locking sleeve 2. The oblong hole 6 thus follows a great circle at the hemispherical front end of the cap-like locking sleeve 2. A similarly extending oblong hole 8 exists in the underlying housing 3 so that a plug 11 inserted in the bore 5 may be pivoted along this oblong hole 8, entraining the blocking member 4 and causing it to pivot in the housing 3. A spring 20 (see FIG. 5) is provided inside the locking sleeve 2 behind the coupler housing 3. The spring 20 causes the locking sleeve 2 to rotate clockwise, as seen from the front, i.e. to the right in the drawing, until it abuts a stop 21 on the coupler housing 3 in the position shown. In this position, the rear end 6A of the oblong hole 6 is opposite one front side of the cylindrical blocking member 4 and is thus rotated 90 with respect to the underlying oblong hole 8 in the housing 3. In this rest position of the locking sleeve 2, which is taken by the sleeve whenever no plug 11 is inserted in the coupler box 1, the locking sleeve 2 protects the diametrical bore 5 in the blocking member 4 against intruding dirt, dust or foreign particles. The locking sleeve 2 may be rotated counter clockwise, as seen from the drawing, on the coupler housing 3 against the force of the inserted spring 20, in the direction of the arrow shown on the locking sleeve 2. This rotation is necessary to insert a plug 11 in the coupler box 1.

Figure 2:
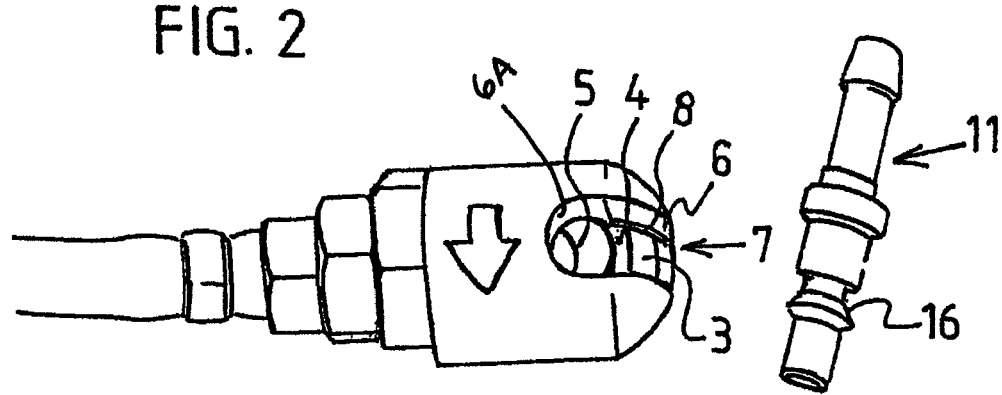
FIG. 2 shows the safety coupling in the decoupled state with the locking sleeve rotated and ready to receive the plug.

FIG. 2 shows the condition of the coupler box 1 after the locking sleeve 2 has been rotated, starting from the situation in FIG. 1, counter clockwise, as seen from the front, by about 90° for inserting a plug 11, which rotation occurred against the force of the inserted spring 20. In this position of the locking sleeve 2, the oblong hole 6 of the sleeve has its rear end 6A exactly above the diametrical bore 5 in the blocking member 4. The bore 5 is thus free to allow a plug 11 to be inserted. The blocking member 4 is still unchanged in the rotary position in which its diametrical bore 5 extends in the coupler housing 3 transversely with respect to the direction of the pressure pipe. The blocking member 4 thus blocks the flow, just as before, so that the bore 5 is not under pressure. Therefore, a plug 11 may be easily inserted in a depressurized state into this bore 5 all the way to its stop. Sealing between the plug 11 and the bore 5 is achieved by a rubber O-ring provided on the plug 11 or inside the bore 5. Until the plug 11 has been inserted, the locking sleeve 2 must be held in the position shown against the effect of the spring force.

Figure 3:
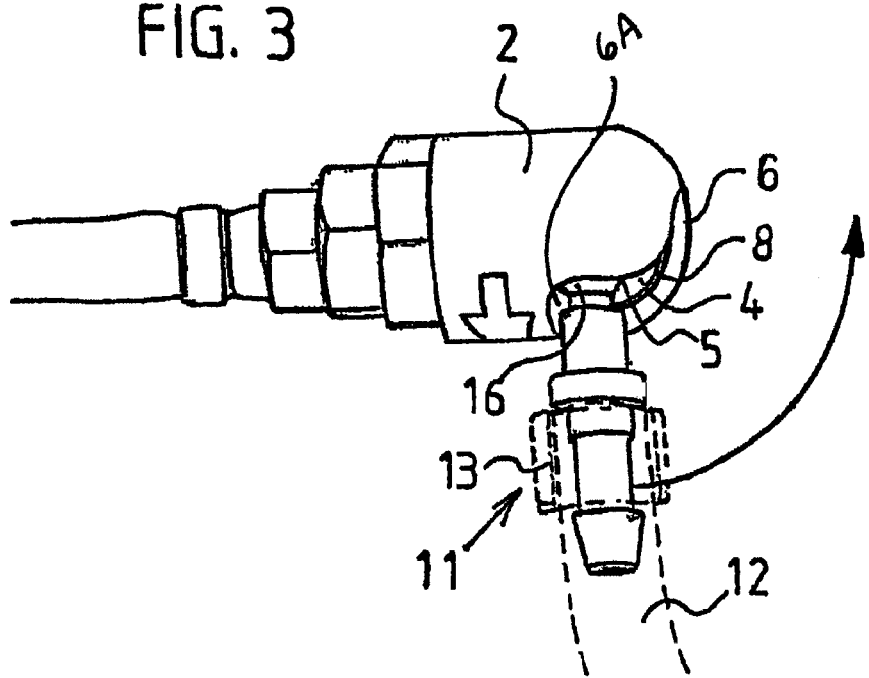
FIG. 3 shows the safety coupling with the plug inserted, before the plug and blocking member are rotated into the conducting position.

FIG. 3 shows the situation after the plug 11 has been inserted into the diametrical bore 5 in the blocking member 4 in a depressurized state. The locking sleeve 2 may now be released. It cannot rotate back to its original position because that is prevented by the plug 11. Starting from the situation shown, the plug 11 which may be, e.g., mounted on the pressure pipe 12 by means of a clamp 13, is pivoted in the direction of the arrow shown, thereby rotating the blocking member 4 within the coupler housing 3, until the plug 11 is aligned with the pressure pipe inside the coupler box 1. During this rotation, the chamfered shoulder 16 provided on a projection of the plug 11 slides under the longitudinal edges of the oblong hole 6 in the housing 3 so that the plug 11 is secured against falling out and is thus retained within the bore 5.

Figure 4:
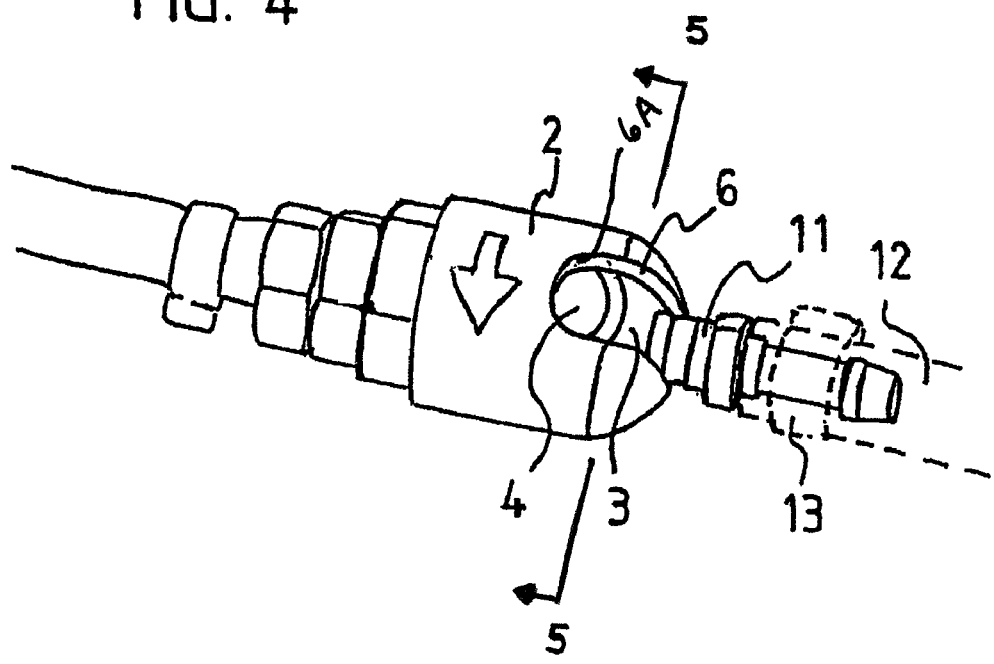
FIG. 4 shows the safety coupling with the plug inserted and in the conducting position.

Finally, the plug 11 takes the position shown in FIG. 4. Toward the end of its pivotal movement, the bore 5 in the blocking member 4 is pivoted into the pressure pipe and then communicates with the latter. The pressurised medium may flow through the coupling, which means that it flows through the bore 5 in the blocking member 4 and then into the plug 11 and the pressure pipe 12. As soon as the plug 11 has reached the position shown in FIG. 4, the locking sleeve 2 can rotate back counter clockwise due to the inner spring 20 so that it assumes the position shown in which the flat front end of the cylindrical blocking member 4 can be seen. In this position, the locking sleeve 2 prevents the plug 11 from rotating back, the plug 11 being also secured against falling out by means of a projecting shoulder being retained at the inner side of the oblong hole 6. The locking sleeve 2 encloses practically all of the coupling. If the coupling is being dragged on the floor, which often occurs in workshops and factories, its round front end prevents it from being caught at any obstacles, more than with an angular housing. The action of the spring force retains the locking sleeve 2 always in the locking position so that both the plug 11 and the blocking member 4 within the coupler housing 3 are safely protected against rotation.

For uncoupling, the locking sleeve 2 is first rotated back counter clockwise by 90° to the right in the drawing, whereby the oblong hole 6 is brought back into the pivoting plane of the plug 11. The plug 11 may then be rotated in the direction of the arrow shown until it abuts the end 6A of the oblong hole 6 within the locking sleeve 2. In this rotary position, which again corresponds to that shown in FIG. 3, the plug 11 may be pulled out of the bore 5 in the blocking member 4 which latter now blocks the flow of the pressure medium. To use the coupling for high pressures or large pipe diameters, it is recommended to provide a release bore 22 (also referred to as a relief bore 22) within the coupler housing 3 which starts from the receiving bore or box, in which the blocking member 4 is pivotally mounted, and is outwardly open. During the pivotal movement of the blocking member 4, as long as the blocking member blocks the flow, this relief bore 22 is in communication with the bore 5 of the blocking member. Thus, when the plug 11 is pivoted back for uncoupling, the pressure in the plug is reduced by the fact that the pressure medium may escape through the relief bore 22 from the pressure pipe 12 and the plug 11 to the outside, as soon as the bore 5 comes to overlay the relief bore 22. Then, the plug 11 is further pivoted along with the blocking member 4 until it assumes its final position shown in FIG. 3. From this position, it may then be pulled out of the bore 5 in the blocking member 4 in a depressurized state. After the plug 11 has been pulled out, the internal spring 20 causes the locking sleeve 2 to pivot back to its initial position shown in FIG. 1.

Figure 5:
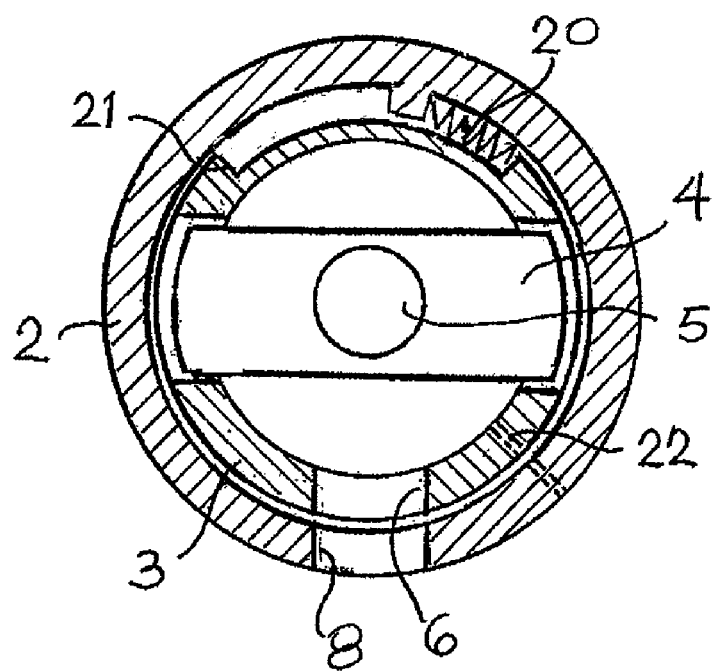
FIG. 5 is a cross-section of the locking sleeve illustrated in FIGS. 1-4, the cross-section being taken along line 5-5 in FIG. 4 at a point in time before the locking sleeve rotates.

FIG. 5 provides a cross section of the locking sleeve illustrated in FIGS. 1-4, the cross-section being taken along line 5-5 in FIG. 4. As illustrated, the spring 20 is disposed inside the locking sleeve 2, behind the coupler housing 3. The spring 20 extends between the locking sleeve 2 and the coupler housing 3 to cause the locking sleeve 2 to rotate clockwise, as discussed above, until it abuts the stop 21 on the coupler housing 3. The relief bore 22 also is illustrated in this figure in greater detail.

The novel locking sleeve 2 may be preferably made of sheet steel or aluminium by pressing. Alternatively, it may be made of aluminium by die-casting. Further alternatives are locking sleeves of plastics which may be formed by injection moulding. For special applications, locking sleeves may be made of brass by being individually milled from bulk material.

Although the plug-in safety coupling for pressure pipes has been described in detail with reference to a certain illustrative embodiment, variations and modifications exist within the scope and spirit of this disclosure as described and defined in the following claims.

The invention claimed is:

1. A plug-in safety coupling for pressure pipes, comprising:
   a coupler box pivotally mounted therein, the coupler box having a first oblong hole;
   a blocking member having a diametrical through bore in which a plug can be inserted in a depressurized state at an acute to a right angle with respect to the conducting position and brought into the conducting position by pivoting the plug;
   a cap-like locking sleeve having a hemispherical front end that is placed over the coupler box with the blocking member;
   the hemispherical front end having a second oblong hole which extends spherically from the center of the hemispherical front end along a great circle on the hemispherical front end; and
   the cap-like locking sleeve being rotatably mounted on the coupler box and actuated by a spring so that the second oblong hole extends at an angle with respect to a pivoting plane of the blocking member and the plug, and being rotatable against the force of the spring into the pivoting plane of the blocking member and the plug.

2. A plug-in safety coupling for pressure pipes according to claim 1, wherein the cap-like locking sleeve is mounted for rotation by 90° on the coupler box and is actuated by the spring such that the second oblong hole extends at an angle of 90° with respect to the pivoting plane of the blocking member and the plug and is rotatable against the force of the spring into the pivoting plane of the blocking member and the plug.

3. A plug-in safety coupling for pressure pipes according to claim 1, wherein the coupler box has a relief bore which connects the through bore to the outside.

4. A plug-in safety coupling for pressure pipes according to claim 1, wherein a stop is formed inside the locking sleeve and at the opposite outer side of the coupler box, so that rotation of the spring loaded locking sleeve abuts a stop when the second oblong hole comes to lie on the front side of the blocking member in the coupler box.

5. A plug-in safety coupling for pressure pipes according to claim 1, wherein the locking sleeve is made of sheet steel or sheet aluminum by pressing.

6. A plug-in safety coupling for pressure pipes according to claim 1, wherein the locking sleeve is made of aluminum by die casting.

7. A plug-in safety coupling for pressure pipes according to claim 1, wherein the locking sleeve is made of plastics by injection moulding.

8. A plug-in safety coupling for pressure pipes according to claim 1, wherein the locking sleeve is made of brass.

9. A plug-in safety coupling for pressure pipes according to claim 1, wherein the first oblong hole defines the pivoting plane of the blocking member and the plug.

10. A plug-in safety coupling for pressure pipes according to claim 9, wherein the plug has a projection with a chamfered shoulder which slides under the second oblong hole in the coupler box when the plug is inserted in the bore and rotated.

11. A plug-in safety coupling for pressure pipes according to claim 1, wherein, when the locking member is rotated into the pivoting plane of the blocking member and the plug, the first and second oblong holes are in register with one another.

12. A plug-in safety coupling for pressure pipes according to claim 11, wherein, when the spring rotates the locking member away from the pivoting plane of the blocking member and the plug, the first and second oblong holes are not in register with one another.

13. A plug-in safety coupling for pressure pipes according to claim 1, wherein the coupler box includes a housing that defines the first oblong hole.

* * * * *